United States Patent
de Hoxar

(10) Patent No.: US 6,660,162 B1
(45) Date of Patent: Dec. 9, 2003

(54) SEPARATOR FOR LIQUID SUSPENSION

(75) Inventor: David de Hoxar, Worthing (GB)

(73) Assignee: Southern Water Services Ltd. (GB)

( * ) Notice: Subject to any disclaimer, the term of this patent is extended or adjusted under 35 U.S.C. 154(b) by 9 days.

(21) Appl. No.: 10/088,923

(22) PCT Filed: Sep. 19, 2000

(86) PCT No.: PCT/GB00/03587
§ 371 (c)(1),
(2), (4) Date: Jun. 10, 2002

(87) PCT Pub. No.: WO01/21273
PCT Pub. Date: Mar. 29, 2001

(30) Foreign Application Priority Data

Sep. 22, 1999 (GB) .............................. 9922472

(51) Int. Cl.[7] .................. B01D 21/26; B01D 17/038; B01D 17/02
(52) U.S. Cl. .................. 210/512.3; 210/512.1; 210/519; 210/520; 210/521; 210/522
(58) Field of Search .............. 210/512.1, 512.3, 210/519, 520, 521, 522

(56) References Cited

U.S. PATENT DOCUMENTS 2,300,129 A * 10/1942 McCurdy ................. 210/512.1
5,252,229 A * 10/1993 Rojey et al. ............. 210/512.1
5,840,198 A 11/1998 Clarke

FOREIGN PATENT DOCUMENTS

WO 92 17260 10/1992
WO 95 01215 1/1995

* cited by examiner

Primary Examiner—David A. Reifsnyder
(74) Attorney, Agent, or Firm—Muserlian, Lucas and Mercanti, LLP

(57) ABSTRACT

There is described a liquid treatment installation including a tank which defines a substantially vertical flow channel of circular cross section. Disposed coaxially in the flow channel there is a spiral separator plate pack 20 which comprises one or more conical helical plates which define at least one helical flow passage between axially facing surfaces of the plate or plates. The conical helical plate or plates of the separator plate pack 20 consist of a plurality of platelets 10, which have dimensions that allow them to pass through an opening 21 which runs axially through the centre of the spiral separator. The invention also relates to a method of constructing the above liquid treatment installation and to a method for assembling the spiral separator plate pack 20.

21 Claims, 12 Drawing Sheets

SEPARATOR FOR LIQUID SUSPENSION

This invention relates to a liquid treatment installation and methods for constructing a liquid treatment installation, and particularly but not exclusively concerns a means for separating solid or liquid particles from a liquid, where said means is arranged to be assembled in situ.

It is known from EP-A-0666769 to provide apparatus in which solid or liquid particles are separated from a liquid by a spiral separator. Spiral separators consist of a number of coaxially helical plates, most preferably in an intertwined multiple helix configuration. These spiral separators may be arranged in a body of liquid to be treated in a tank, and rotated to induce an axial flow of liquid along a number of helical flow paths. The direction of the axial flow depends on whether liquid is added to the tank at the top or the base of the body of liquid. For example, when liquid is added to the tank at the base and drawn off at the top to remove denser solid or liquid impurities, the separator or separators are rotated so as to induce an upflow through the separators. However, as the spiral separators are single components of considerable physical size, their manufacture, transport and installation all prove to be difficult.

It is an object of the present invention to provide a spiral separator which can be constructed from a plurality of smaller components, to reduce the transport and handling problems outlined above.

According to a first aspect of the present invention, there is provided a liquid treatment installation comprising a tank defining a substantially vertical flow channel of circular cross section, a spiral separator comprising one or more conical helical plates defining at least one helical flow passage between axially facing surfaces of the plate or plates, the spiral separator being disposed coaxially in the flow channel, the diameter of the separator being substantially equal to that of the flow channel, the spiral separator being capable of rotating about the axis of the flow channel, an inlet means arranged to supply unseparated liquid to the tank, and an outlet means arranged to withdraw treated liquid from the tank, the inlet and outlet means are vertically spaced in relation to the tank and the arrangement being such that between the inlet and the outlet means the liquid flows vertically through the helical flow passages of the spiral separator, wherein the conical helical plate of the separator comprises a plurality of platelets.

According to a second aspect of the present invention, there is disclosed a spiral separator which comprises a "plate pack" including a conical helical plate, defining a helical flow passage between axially facing surfaces of the plate, the spiral separator being disposed coaxially in a flow channel of a liquid treatment installation, the diameter of the separator being substantially equal to that of the flow channel, the spiral separator being capable of rotating about the axis of the flow channel, wherein the conical helical plates of the plate pack comprises a plurality of platelets.

According to a third aspect of the present invention, there is disclosed a platelet which is shaped as a sector of an annulus. Two edges are concentrically curved so that a shorter one of the two is concave and the longer curved edge is convex, and the curved edges are joined by a pair of diverging edges extending substantially radially with respect to the concentric edges, the plate also being curved about an axis in the plane of the plate which is perpendicular to the concentric edges. The diverging edges form a leading edge and a trailing edge of said platelet, and when the platelet is in position in a plate pack, the platelet is separated from the top of bottom surfaces of an axially adjacent platelet by a spacing means.

According to an embodiment of the third aspect of the present invention, there is disclosed a platelet which is shaped as a sector of an annuls. Two edges are concentrically curved so that a shorter one of the two is concave and the longer curved edge is convex, and said edges are joined by a pair of diverging edges extending radially with respect to the concentric edges. The diverging edges form a leading edge and a trailing edge of said platelet. The leading edge of the platelet may be offset in the thickness direction of the platelet by a distance substantially equal to the thickness of the platelet so that a continuously smooth upper surface is obtained when adjacent platelets overlap. The platelet is also provided with a flange section, which is situated at the shorter, concave edge of the platelet and forms a cylindrically curved wall fitted concentrically with the concave curved edge. The edge of the flange section remote from the platelet may be radially inset and has one or more recessed portions which are further radially inset. Both the flanges and the radially insert portion of the flange possess locating means, wherein said flange acts as spacing means which, when the platelet is in position in a plate pack, separates the platelet from the top or bottom surface of axially adjacent platelets, and further where said locating means allow axially adjacent platelets to be positioned so that fluid communication is provided between a central axial tube formed by the flanges of adjacent platelets and a flow channel.

According to a fourth aspect of the present invention, there is disclosed a method of constructing a spiral separator, for use in a liquid treatment installation, wherein in a first construction step a plurality of platelets are attached to an annular driving ring to form a first ring of platelets, and in a subsequent construction step platelets are passed through a central opening of the first ring of platelets, and are attached to the platelets that form the first ring.

The advantages of constructing a spiral separator from said platelets is firstly that the separator can be assembled in situ, which eliminates the need for heavy lifting equipment in the transport and installation processes. Furthermore, because the separator consists of an assembly of individual platelets and is not an integral component, then any faults in or damage to the separator can be rectified by replacing the individual faulty or damaged platelets.

The dimensions of the platelets are such that the construction of a spiral separator comprising a plate pack can be carried out inside the flow passage where the plate pack will operate.

In a preferred embodiment, the separator comprises a plurality of conical helical plates which have been formed from the individual platelets and are arranged in an intertwined multiple helix configuration to form a plate pack.

In an advantageous embodiment, the platelets are tapered across their cross section in a direction from the leading edge to the trailing edge or vice versa, so that the overlapping edges of each platelet do not cause thickening at the joints.

In another aspect of the preferred embodiment, the spiral separator may be installed in an existing tank with any non-circular cross section. The existing tank may have any desired shape in plan, and may contain internal filler blocks so that a flow channel of circular cross section is provided.

An advantage of being able to instal the spiral separator in an existing tank is that overall cost is reduced because costs associated with the construction of the tank are eliminated.

In another embodiment, a method of constructing a spiral separator involves attaching, at a working position, a number of platelets to an annular driving ring which is also attached to a lifting means, to form a ring of platelets and, upon completion of the ring, lifting the annular driving ring so that another ring of platelets can be added to the plate pack without moving the working position.

An advantage associated with such a method of construction is that the construction always takes place at the same level (e.g. the bottom of a tank or containing means). In some circumstances, it is more convenient to move the partially complete plate pack as work proceeds than to move a working platform.

Embodiments of the invention will now be described by way of example only and with reference to the accompanying drawings, in which.

Figure 1:
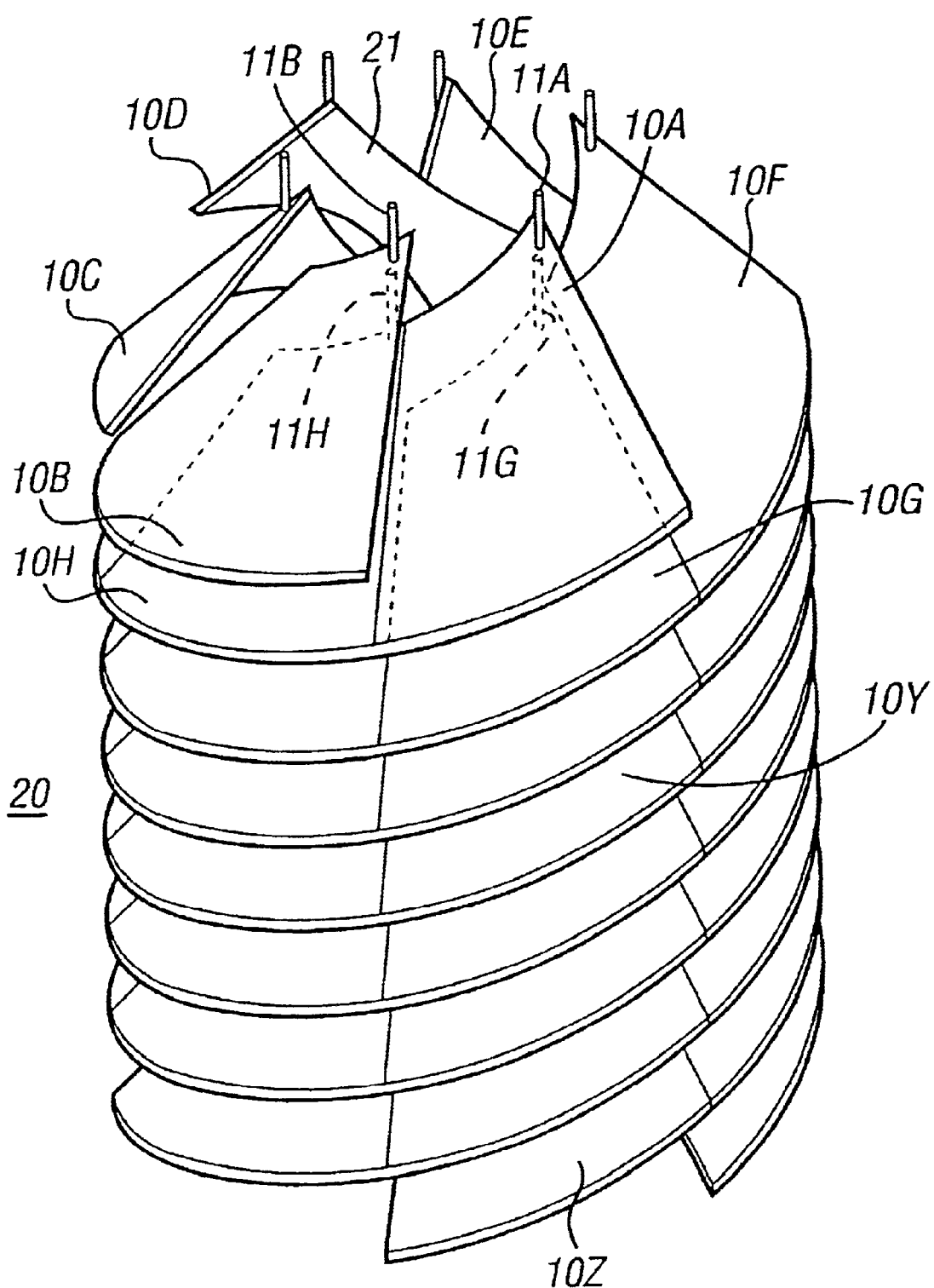
FIG. 1 is a schematic diagram showing a plurality of conical helical plates formed from platelets and arranged in an intertwined multiple helix configuration to form a plate pack.

In the completed plate pack 20 as shown in FIG. 1, platelets 10A to 10F form a first ring of platelets. At the centre of the plate pack 20 there is an opening 21 which runs axially through the entire length of the plate pack 20. When the plate pack 20 has been installed in a treatment installation, then a central stilling tube 46 (not shown) will be positioned in the central opening 21. The spacing means 11G,11H of platelets 10C,10H are in axial alignment with the spacing means 11A,11B of platelets 10A,10B. The spacing means 11G,11H are fixed to positions on the underside of platelets 10A,10B which correspond to the positions of spacing means 11A,11B on the top side of platelets 10A,10B.

Figure 2:
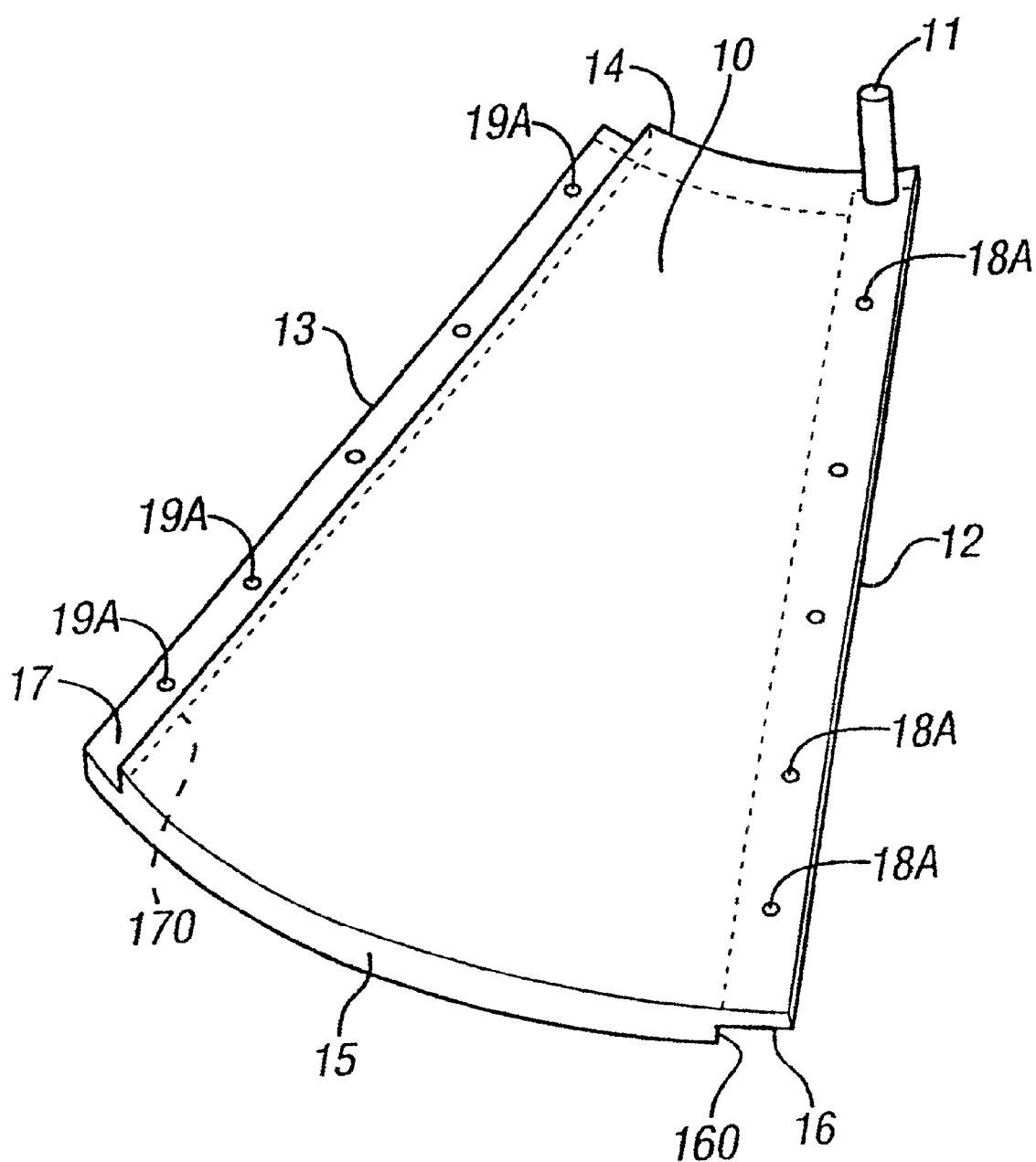
FIG. 2 shows a single platelet.

A platelet 10 shown in FIG. 2 is one of a plurality of platelets needed to form a conical helical plate. The platelet 10 is shaped like a sector of an annulus. Two edges (root 14, tip 15) are concentrically curved so that the root 14 is concave and the tip 15 is convex, the curves being about an axial perpendicular to the plate of the plate, the plate also being curved about an axis in the plane of the plate which is perpendicular to the curved edges and the diverging edges extend radially with respect to the curves. At a leading edge 12 there is a thinned portion 16. A step 160, formed by the thinned portion 16 and the main body of the platelet 10, extends radially with respect to the curves and is parallel to the leading edge 12. There is another thinned portion 17 at a trailing edge 13 of the platelet 10. A step 170, formed by the thinned portion 17 and the main body of the platelet 10, extends radially and is parallel to the trailing edge 13. These thinned portions 16 and 17 are arranged so that an overlapping joint may be formed with the corresponding thinned portions 16, 17 of adjacent platelets 10 in a plate pack 20. The thinned portion 16 at the leading edge 12 is provided with a plurality of holes 18A which are situated midway between the leading edge of the platelet and the step 160 between the thinned portion 16 and the main body of the platelet 10, and are equidistantly spaced in a radial direction. The thinned portion 17 at the trailing edge 13 is also formed with a plurality of holes 19A, and these are arranged in the same way as the holes 18A mentioned previously. The platelet is also provided with a spacing means 11, positioned in a corner near to the root 14. The purpose of the spacing means 11 is to separate the platelet 10 from an axially adjacent platelet.

Figure 3:
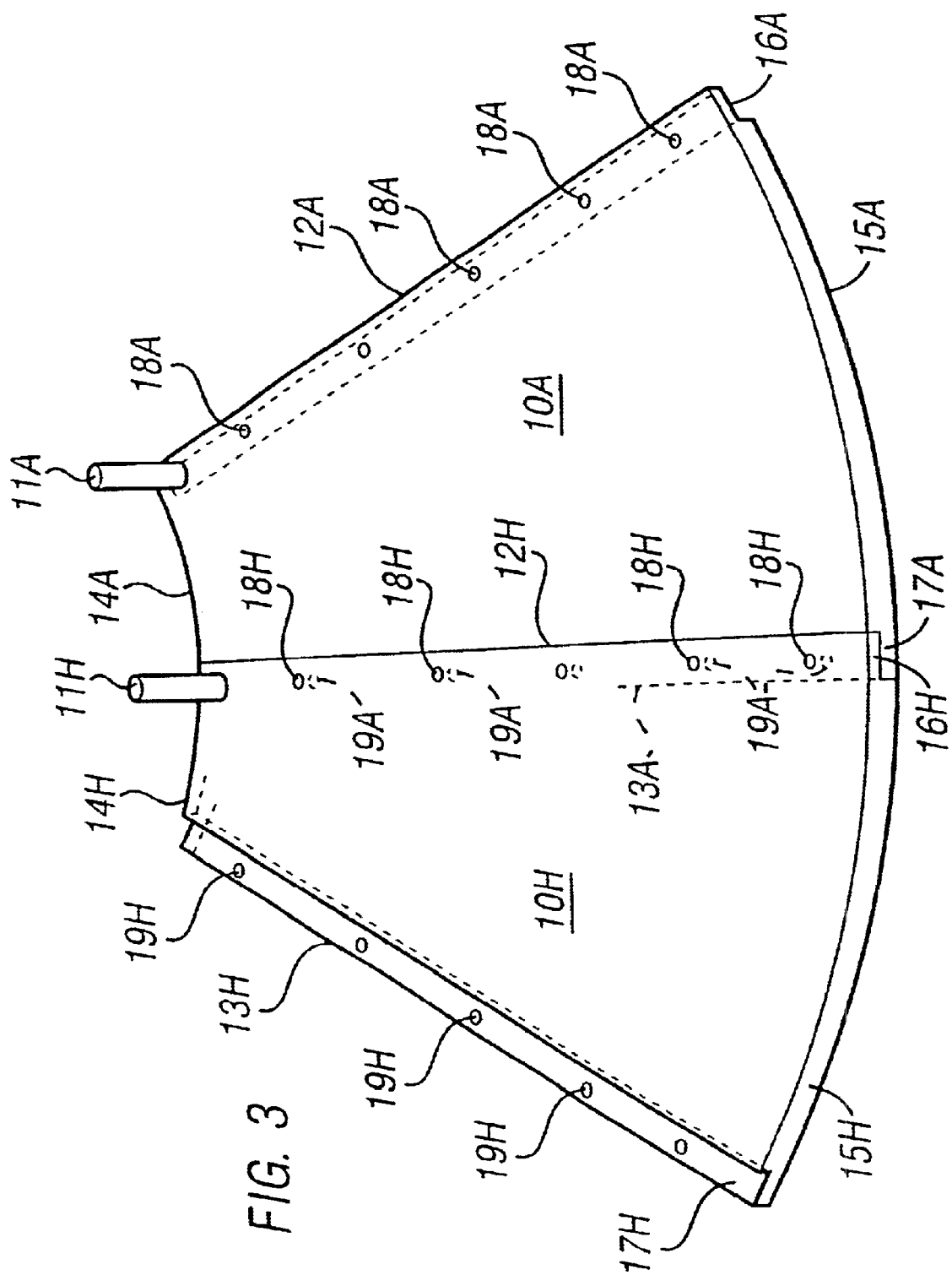
FIG. 3 shows how two of the platelets of FIG. 2 fit together.

FIG. 3 shows two adjacent platelets 10A,10H where like reference numbers refer to corresponding parts, with the suffix A for parts of one platelet and the suffix H for the other. It can be seen that the plurality of holes 18H at the leading edge 12H of platelet 10H correspond with the plurality of holes 19A at the trailing edge 13A of plate 10A. Fixing means such as rivets, screws, dowels, bolts, etc may be used to connect adjacent platelets.

It can be seen from the figure that the step of the platelet 10A abuts with the leading edge 12H of the adjacent platelet 10H and also, the trailing edge 13H of the platelet 10A abuts with the step of the adjacent platelet 10H, so that thinned portions 16A,17A co-operate to form an overlapping joint.

Figure 4:
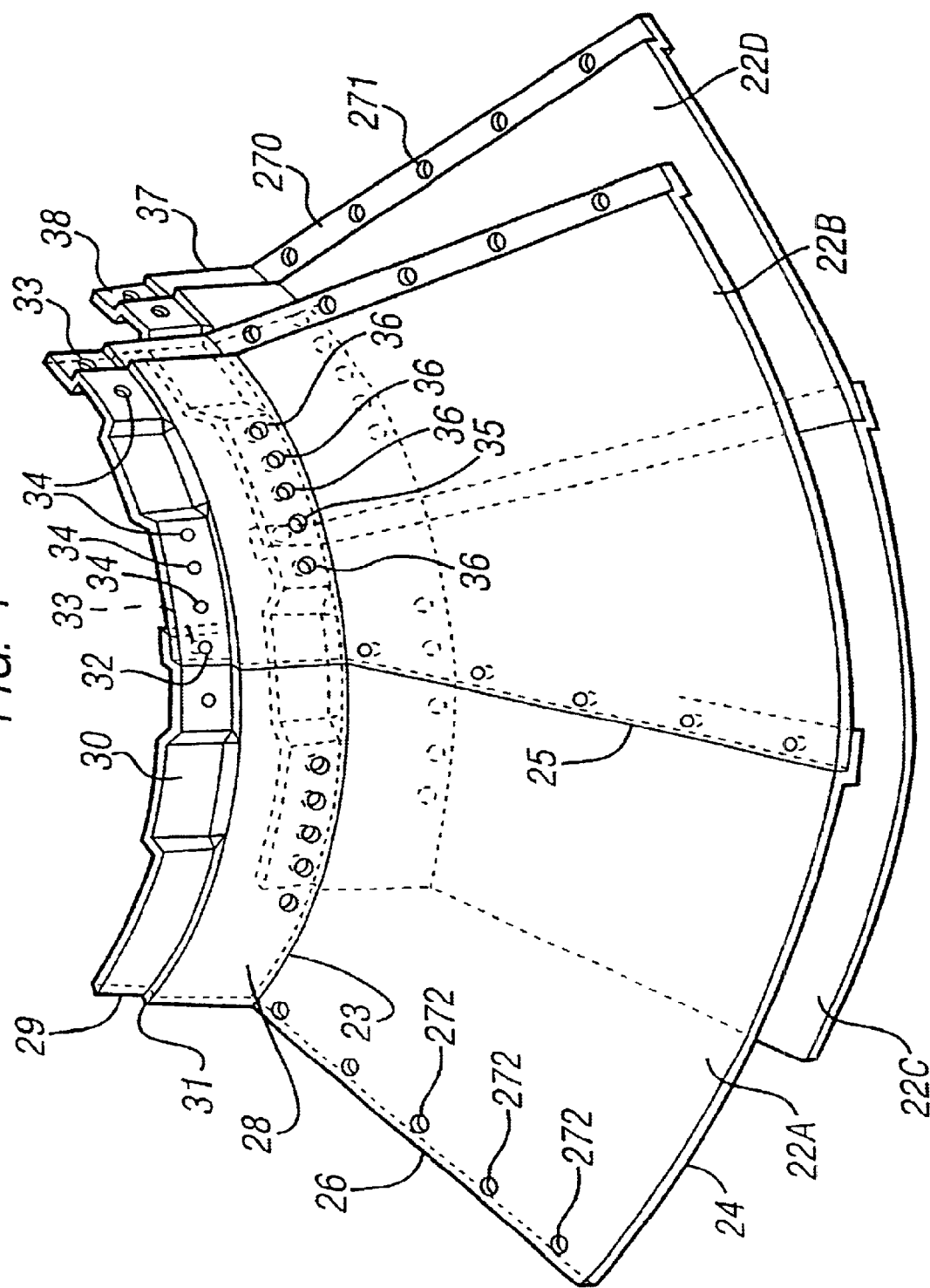
FIG. 4 shows a number of platelets in a different embodiment.

A second type of platelet 22 is shown in FIG. 4. Suffixes A,B,C,D will be used in the text to identify the parts of each of platelets 22A, 22B, 22C and 22D. However, in the Figure only the platelets have been given the suffixes A,B,C,D so as to perserve clarity.

Platelets 22A,22B,22C,22D are shaped as a sector of an annular and are identical. Two edges 23,34 are concentrically curved so that a shorter one 23 of the two is concave and the longer curved edge 24 is convex, and said edges are joined by a pair of diverging edges 25,26 extending radially with respect to the concentric edges 23,24. The diverging edges 25,26 form a leading edge 25 and a trailing edge 26 of said platelet 22. The leading edge 25 of the platelet is offset 270 in the thickness direction of the platelet by a distance substantially equal to the thickness of the platelet so that a continually smooth upper surface is obtained when adjacent platelets 22A,22B or 22C,22D overlap. Both the trailing edge 26 and the offset 270 in the leading edge 25 are formed with a plurality of holes 272,271. These holes 272,271 are equidistantly spaced in a radial direction and allow adjacent platelets 22A,22B or 22C,22D to be fixed together. It can be seen that when adjacent platelets (e.g. 22A,22B) are fixed together, holes 271A in the offset 270A at the leading edge 25A correspond with the holes 272B at the trailing edge 26B. In an alternative to the above, the trailing edge 26 of the platelet 22 may be offset in the thickness direction of the platelet so that a continually smooth upper surface is obtained when adjacent platelets (e.g. 22A,22B) overlap.

The platelet 22 is also provided with a flange section 28, which is situated at the shorter, concave, edge 23 of the platelet 22, and forms a cylindrically curved wall fitted concentrically with the concave curved edge 23. This flange section 28 may also extend in a direction opposite to that shown, or may be positioned so that it extends in both axial directions from the concave curved edge 23. The edge 29 of the flange section 28 remote from the platelet may be radially inset and has one or more recessed portions 30 which are further radially inset. A step 31 is formed between the flange 28 and the radially inset portion 29 of the flange. Both the flange 28 and the radially inset portion 29 of the flange possess sections 37,38 which are offset radially inwards at the leading edge 25 and which are a continuation of the offset portion 270 of the leading edge 25 of the platelet 22. The radially inset portion 29 of the flange is formed with a plurality of holes. A holes 32 is formed at the trailing edge of the radially inset portion 29 of the flange and a hole 33 is formed in the section 38 of the radially inset portion 29 of the flange. In two adjacent platelets (e.g. 22A,22B) the holes 32B corresponds with the hole 33A. Further holes 34 are formed in the radially inset portion 29 of the flange and the purpose of these holes 34 will be explained later. The flange 28 is formed with a plurality of holes 36 of which a specific hole 35 performs a function which will also be explained later.

In an arrangement as shown in FIG. 4, two adjacent platelets 22A,22B cooperate with two other adjacent platelets 22C,22D which are axially adjacent to the platelets 22A,22D. However, it can be seen that the platelets 22 are not in direct axial alignment and that adjacent platelets 22A,22B are offset circumferentially relative to adjacent platelets 22C,22D. The concave edges 23A,23B where flanges 28A,28B meet platelets 22A,22B sit on the steps 31C,31D of axially adjacent platelets 22C,22D. It can be seen that the plurality of holes 36B in the flange 28B correspond with the plurality of holes 34C,D in the radially inset portion 29D of the flange, and in particular hole 35D of the flange 28B corresponds with holes 32D and 33C of the axially adjacent platelets 22C,22D. Thus when a plate pack 20 is complete, the flanges 28 of the platelets 22 form a central axial tube through the centre of the plate pack 20, and said recessed portions 30 provide a means for flow of solid particles and liquids.

Figure 5:
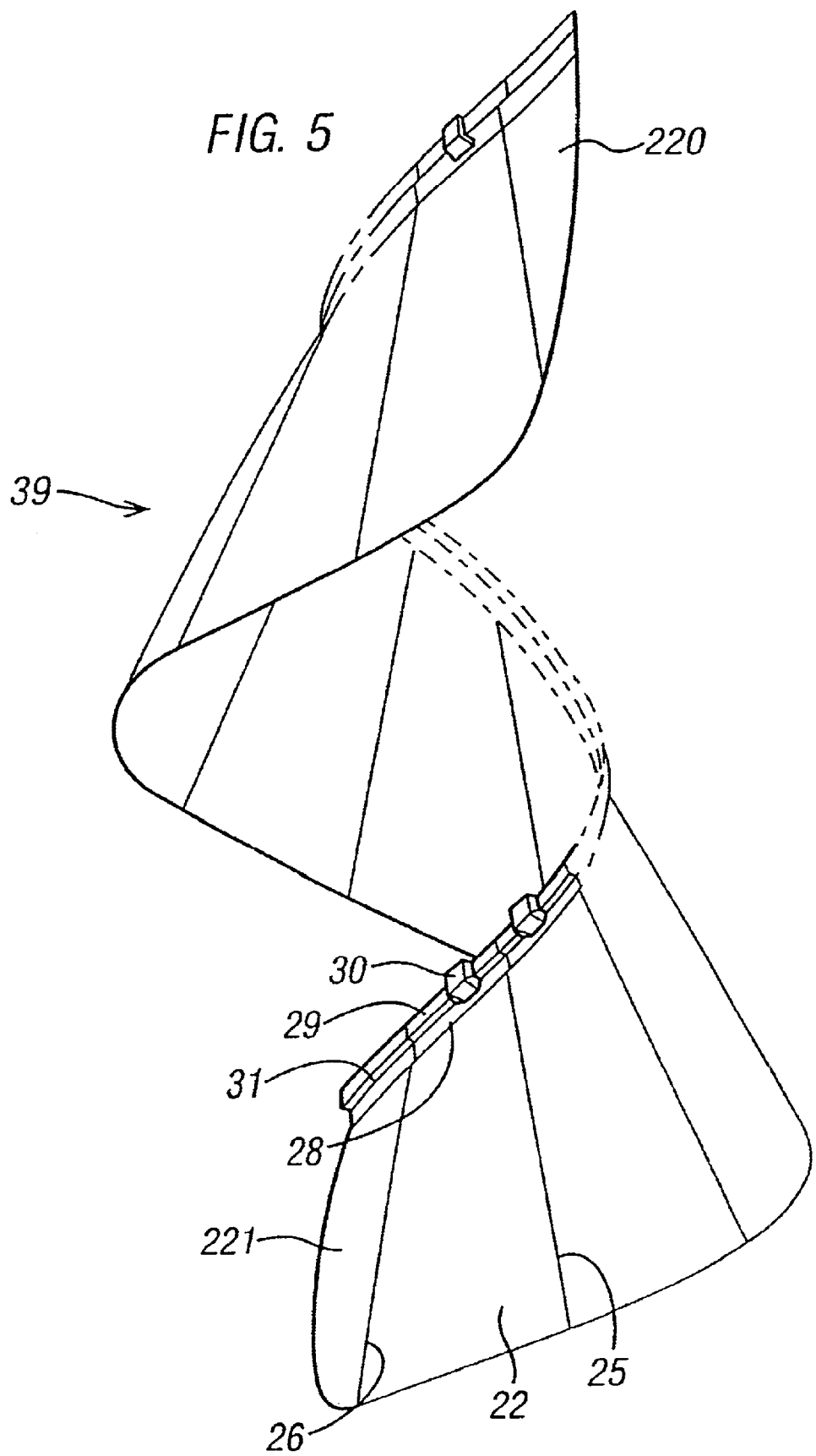
FIG. 5 is a schematic diagram showing a conical helical plate formed from a number of the platelets of FIG. 4.

A series of adjacent platelets 22 linked together will form a conical helical plate 39 as shown in FIG. 5. The conical helical plate 39 is also provided with a leading platelet 220, and a trailing platelet 221. Preferably both possess a flange 28, a radially inset portion 29 of the flange, and a recessed portion 30.

Three alternative construction methods will now be described, and the description applies to both the platelets 10 and the alternative platelets 22, but only the reference number 10 will be used in the following description to preserve clarity.

Figure 6:
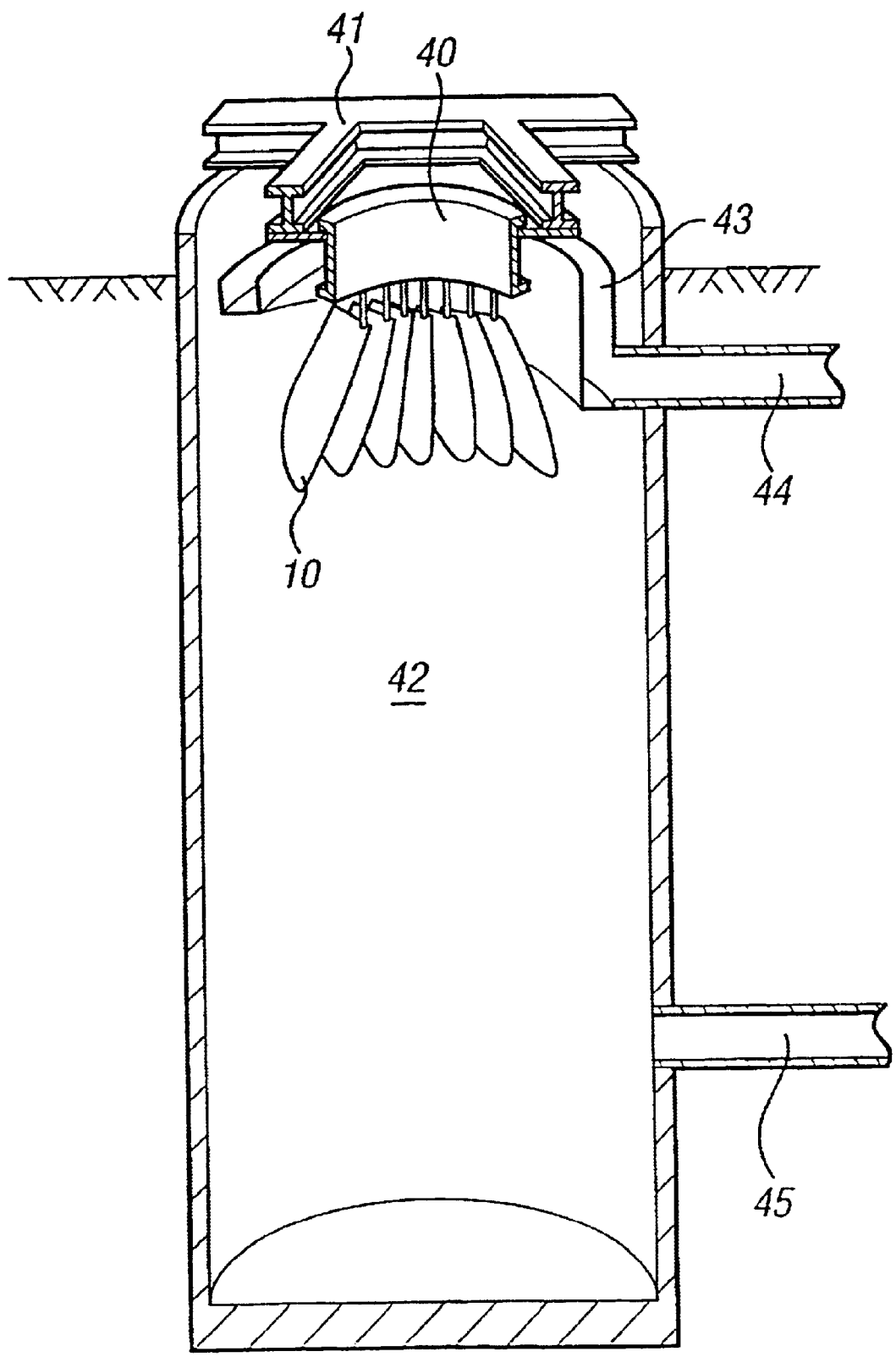
FIG. 6 shows a sectioned side elevation of the containing means at the initial stage of the plate pack construction in a first method.

The initial in situ construction phase is shown in FIG. 6. The set of platelets 10A to 10F which are to form the first ring of platelets are bolted onto the periphery of an annular driving ring 40 which in turn is suspended from a bridge 41 at the top of a containing means 42. In the initial stages of construction, platelets 10 are passed through the centre of the annular driving ring 40. There are a number of ways of carrying out this part of the construction phase. A platelet 10 is passed through the centre of the annular driving ring 40 and is then attached to the periphery of the annular driving ring 40. This process is carried out until construction of the plate pack 20 is complete. Alternatively, a number of platelets 10 are passed through the centre of the annular driving 40 and stored at the bottom of the containing means 42. The platelets 10 are then raised, one at a time, from the bottom of the containing means 42 and are then attached to the periphery of the annular driving ring 40. This process is repeated until the plate pack 20 is complete. Another alternative is where the entire set of platelets 10 needed to complete the plate pack 20 is passed through the centre of the annular driving ring 40 and stored at the bottom of the containing means 42. As above, the platelets 10 are then raised, one at a time, from the bottom of the containing means 42 and attached to the periphery of the annular driving ring 40.

Situated near the top of the containing means 42 is a launder 43 which is attached to the wall of the containing means 42 and makes a complete circuit around the perimeter of the containing means 42. The launder 43 is attached to an outlet 44 which in the completed installation will remove treated liquid from the containing means. The launder 43 is situated at a level that will be slightly lower than the liquid level in the fully completed installation so that treated liquid may overflow into it and be removed via outlet 44. Also shown in the diagram is an inlet 45 through which untreated liquid may reach the containing means 42. Not shown on this diagram is a driving means which is attached to the annular driving ring. At the stage of construction that this Figure shows, the platelets need to be supported as they do not have inherent stiffness to be self-supporting until several platelets have been joined together. This may mean that this support is needed until 2 or 3 complete rings of platelets are fixed into position. Platelets 10 to be added to the underside of higher platelets, have access through the opening 21 at the centre of each complete ring of platelets.

Figure 7:
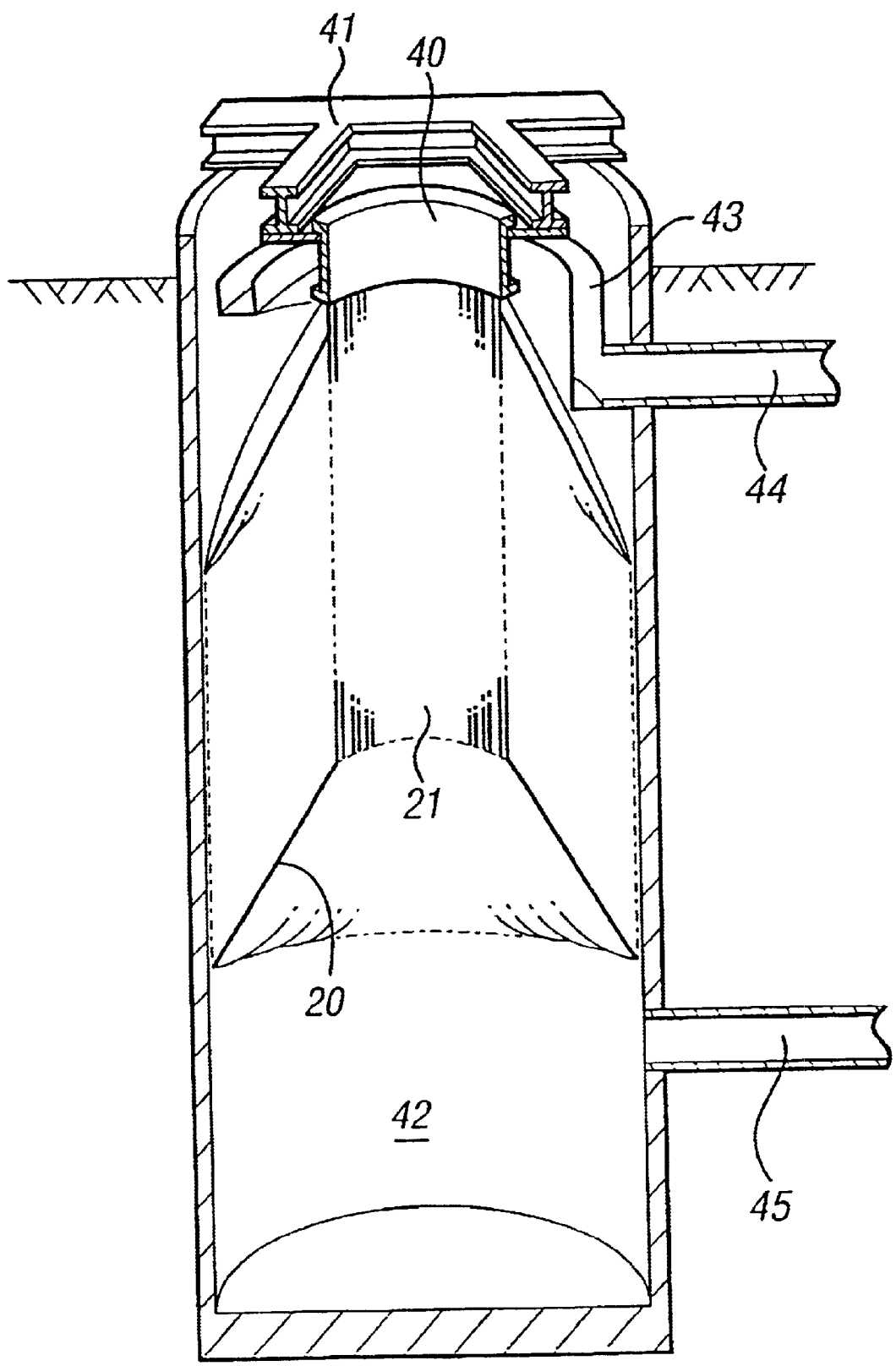
FIG. 7 shows a sectioned side elevation of the containing means when plate pack construction has been completed.

The complete plate pack 20 is shown in FIG. 7. If, at any time, it is necessary to replace a platelet, then this can be done by dismantling the plate pack 20 from the bottom. This eliminates the need for plate pack removal from the containing means 42 when the replacement of platelets 10 is necessary.

Figure 8:
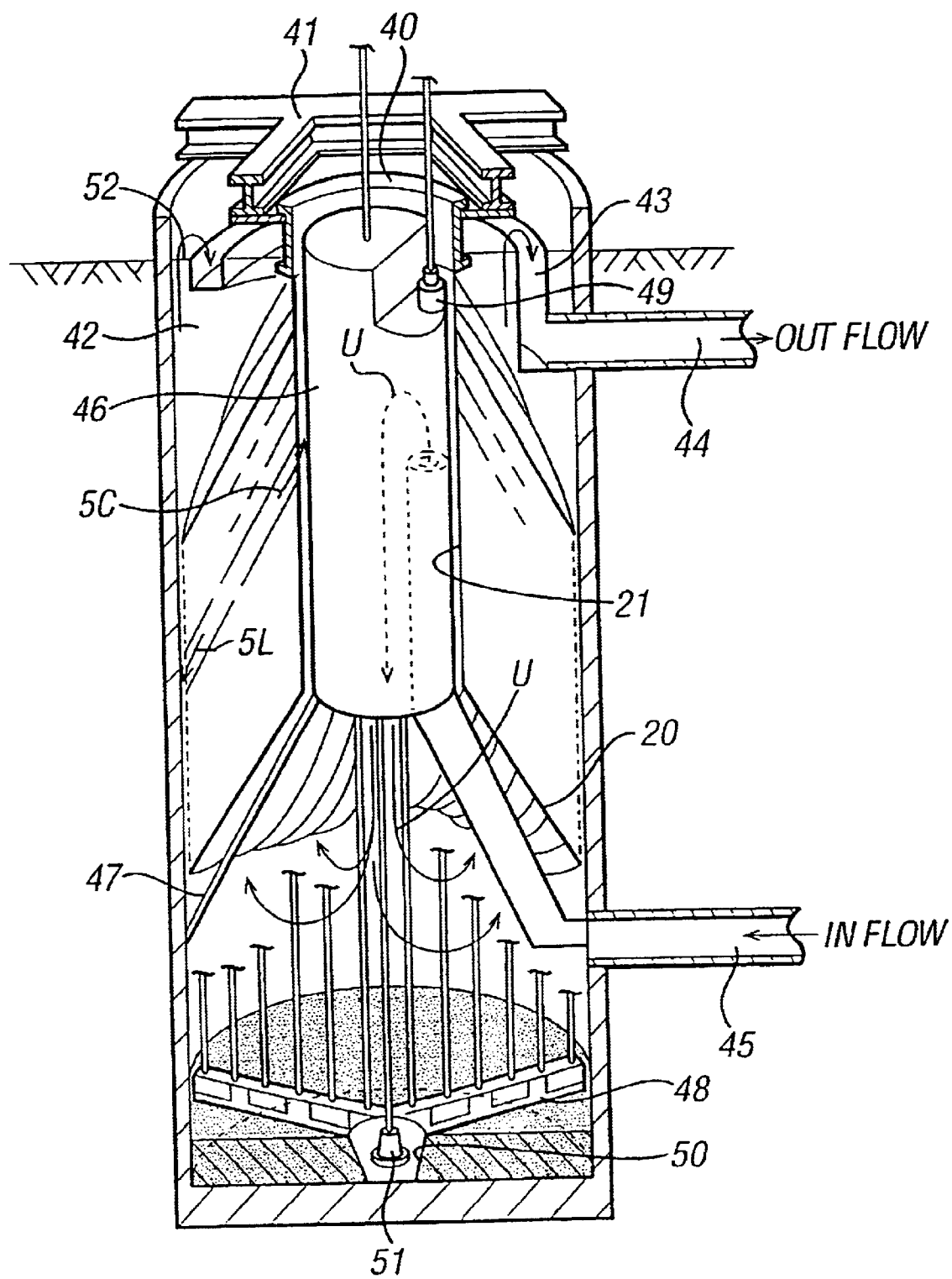
FIG. 8 shows a sectioned side elevation of the completed liquid treatment installation.

In the completed liquid treatment installation as shown in FIG. 8, a central stilling tube 46 has been added and is situated within the central opening 21 of the complete plate pack 20. The central stilling tube 46 is provided with an inlet pipe 45 and a scum pump 49. The central stilling tube 46 is supported by a supporting strut 47 as shown. The arrangement in FIG. 8 shows a central well 50 for sludge which is provided with a submersible sludge pump 51. The scum pump 49 may also be a submersible pump. This may be installed with its intake port uppermost, to remove scum from the liquid surface 52. The arrows 5C, 5L indicate the flow directions of scum and sludge respectively in this particular embodiment. Arrow U indicates the flow direction of untreated liquid.

The second method of construction will now be described using corresponding reference numerals to those of preceding figures where appropriate for corresponding elements.

Figure 9:
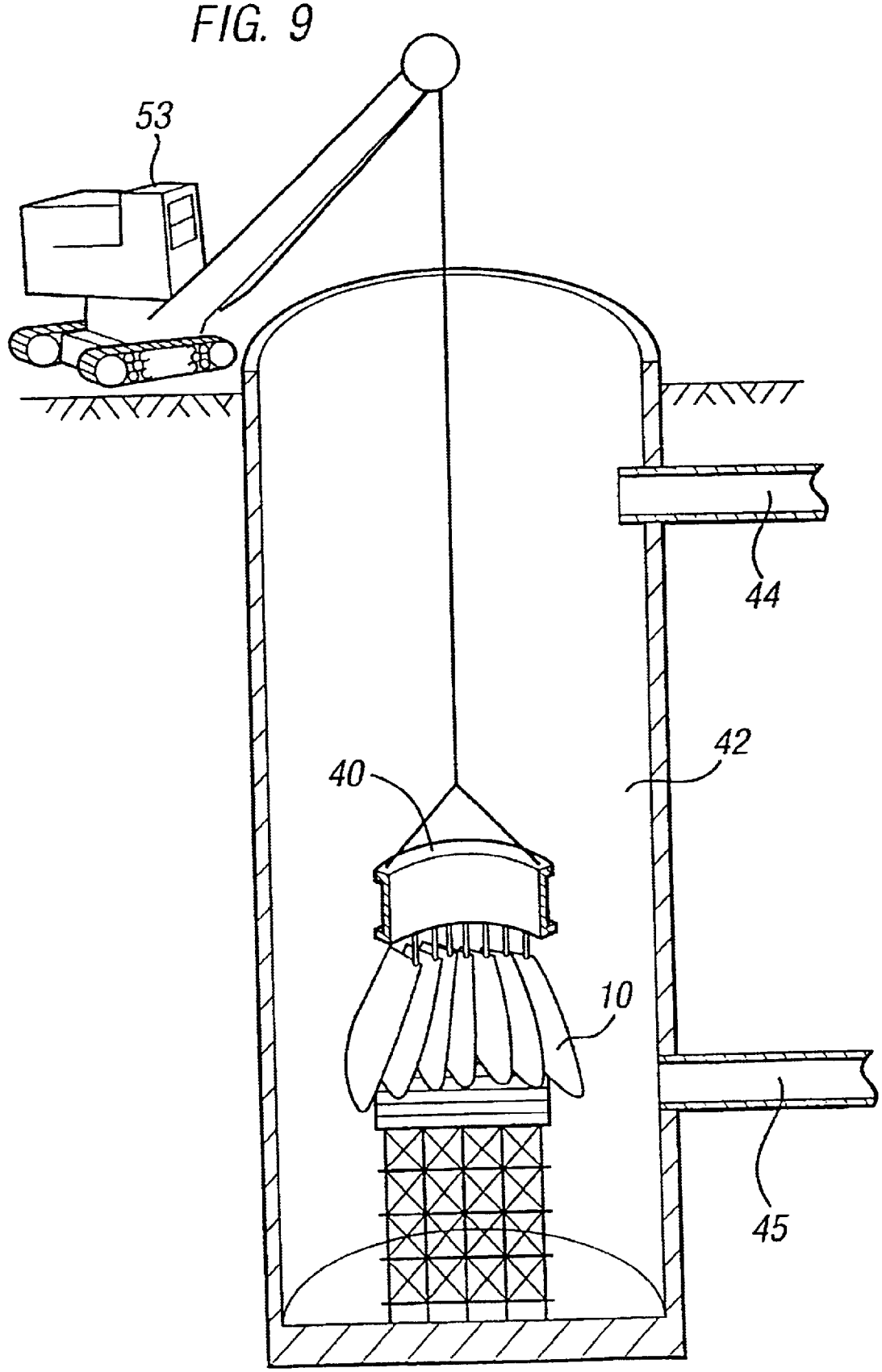
FIG. 9 shows a sectioned side elevation of the containing means at the initial stage of plate pack construction in a second method.

FIG. 9 shows a set of platelets 10 forming a first ring of platelets of the plate pack 20, attached to an annular driving ring 40. The annular driving ring 40 is also attached to a lifting means 53 so that the whole assembly may be raised or lowered when needed. It can be seen that in this method of construction, work takes plate at the bottom of the containing means 42.

As in the previous method of construction there are alternative ways of carrying out the plate pack 25 construction phase.

A platelet 10 is passed through the centre of the annular driving ring 40 and is then attached to the periphery of the driving ring. This process is repeated until the ring of platelets currently under construction is complete. The annular driving ring 40 is raised enough so that the same process can be repeated in the construction of the next ring of platelets. Alternatively, enough platelets 10 to form a complete ring of platelets are passed through the centre of the annular driving ring 40 and stored on the bottom of the containing means 42. The platelets 10 are then raised, one at a time, from the bottom of the containing means 42 and attached to the periphery of the annular driving ring 40. The annular driving ring 40 is raised enough so that the next ring of platelets can be constructed. This process is then repeated until the plate pack 20 is complete. Further alternatives to the above involve raising the annular driving ring 40 so that construction can be carried out on two or more rings of platelets at a time.

Figure 10:
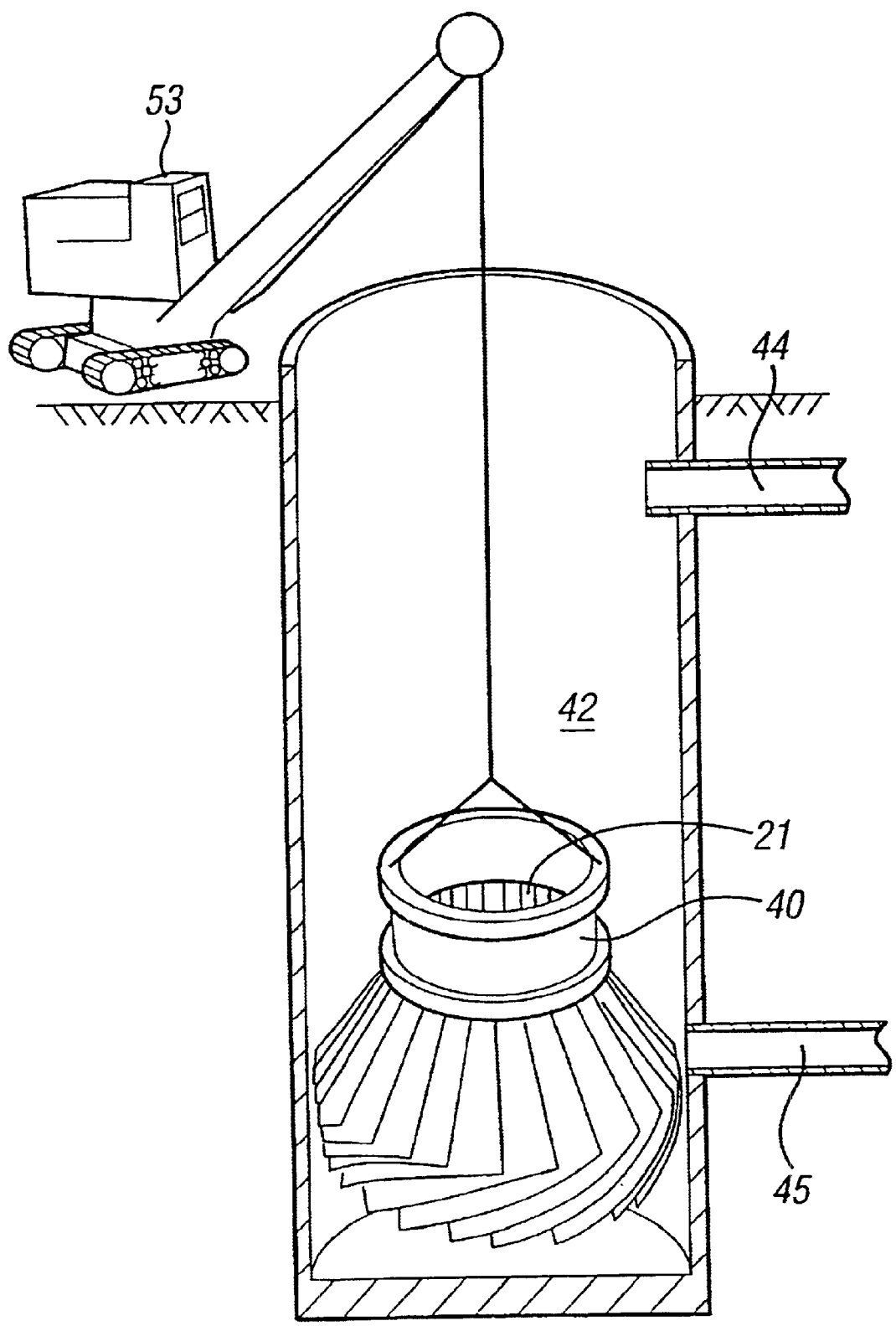
FIG. 10 shows a sectioned side elevation of the containing means when plate pack construction (second method) is partially complete.

FIG. 10 shows the arrangement of FIG. 9 where a number of subsequent rings of platelets have been added to the plate pack 20. The entire assembly has been raised using the lifting means 53, to allow construction to take place at the same level.

Figure 11:
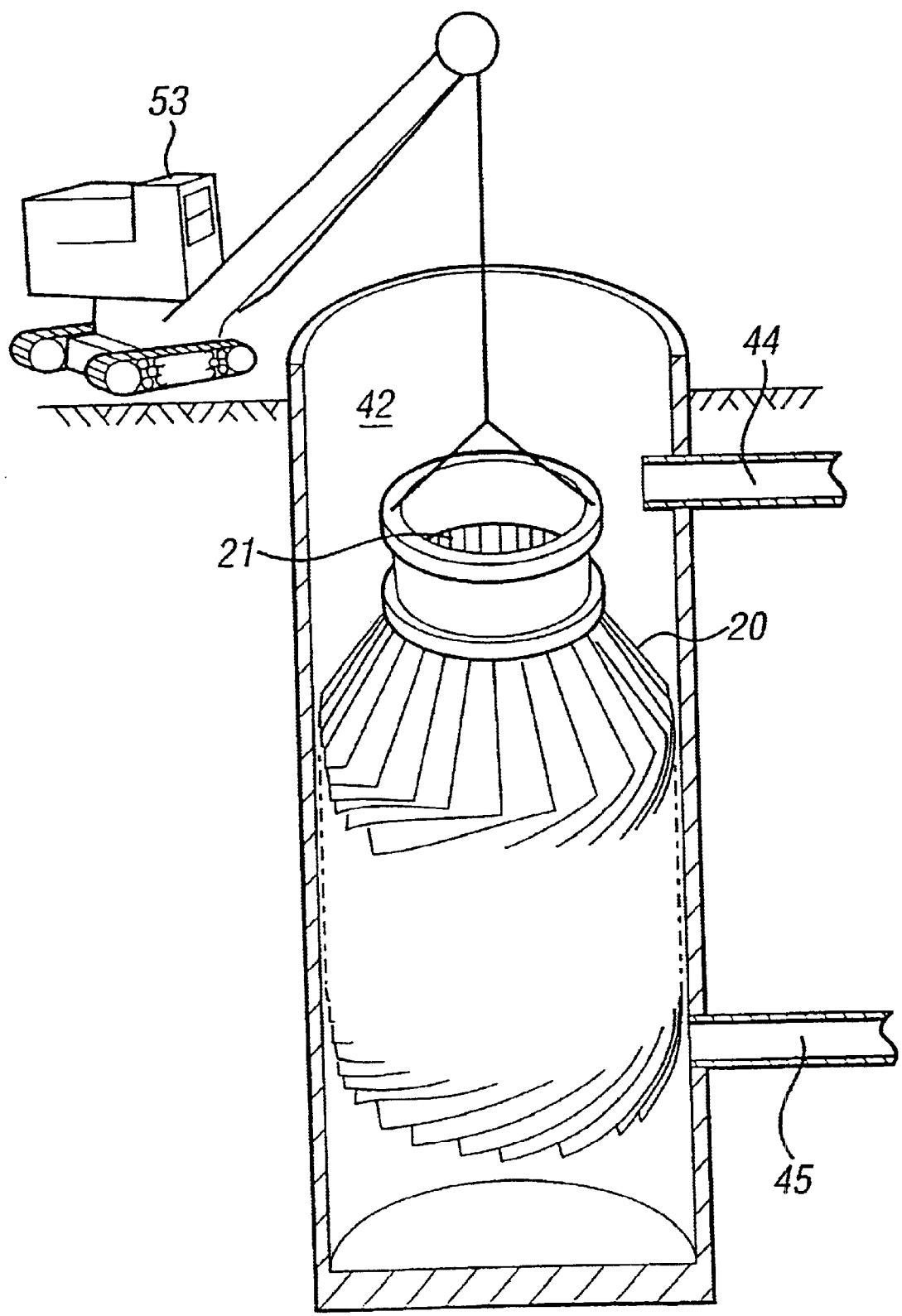
FIG. 11 shows a sectioned side elevation of the containing means when plate pack construction (second method) has been completed and before the annular driving ring is fixed into position.

FIG. 11 shows the construction phase near completion. The plate pack 20 is complete, and the annular driving ring will be attached to a bridge (not shown). The final state of the liquid treatment installation is that shown in FIG. 8.

Figure 12:
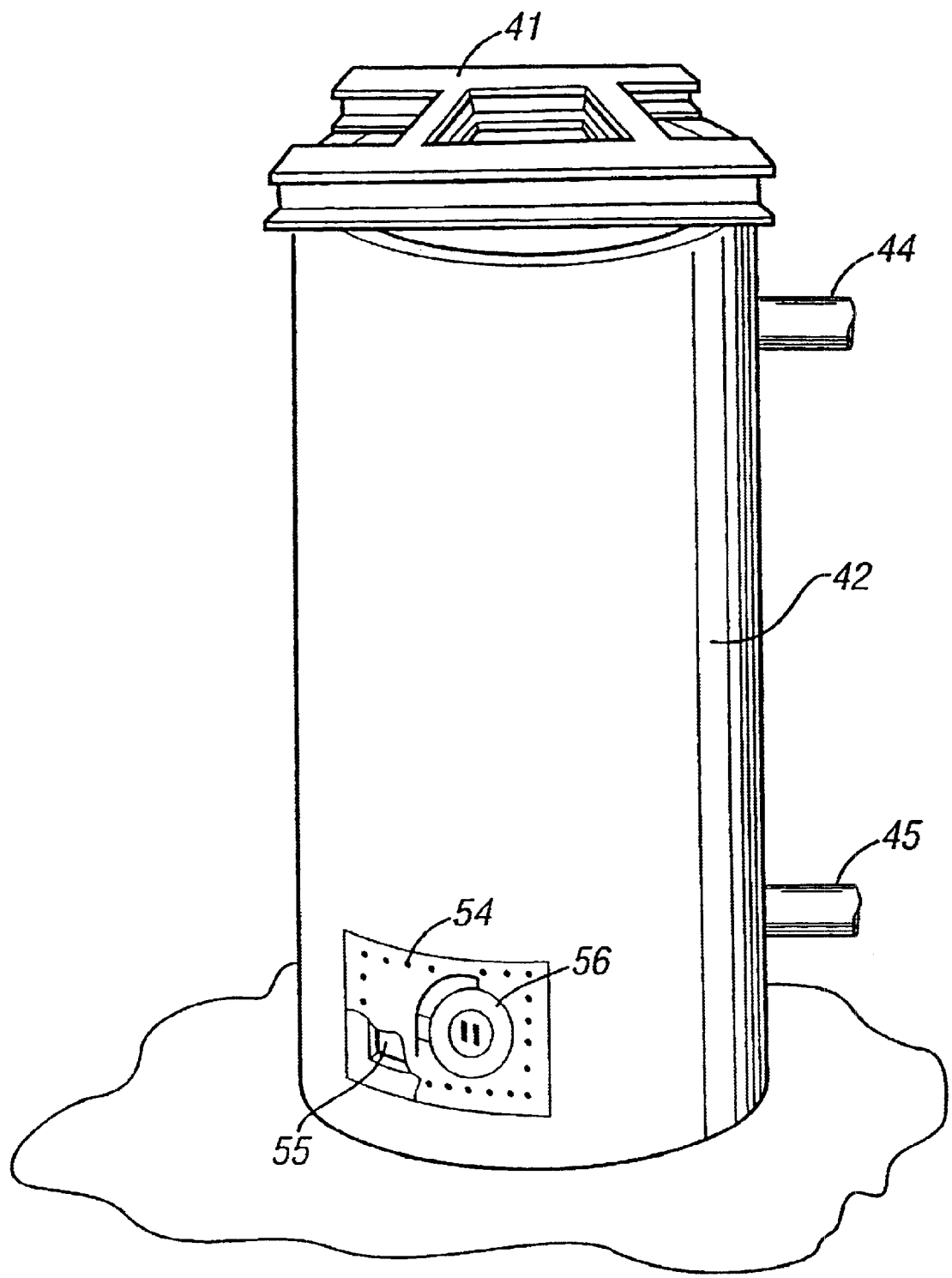
FIG. 12 shows a perspective view of a containing means for use in a third method of assembling the plate pack.

FIG. 12 shows an embodiment of the invention where the containing means 42 is situated substantially above ground level. The containing means 42 is formed with an access hole 55 which is located near the lower end of the containing means 42. The dimensions of the access hole 55 are such that platelets can be passed through the access hole 55 during the construction phase. The method of construction in this embodiment is similar to the second construction method as referred to above in relative to FIGS. 9, 10 and 11. In this third method, however, platelets are not longer passed through the centre of the annular driving ring (not shown), but are passed through the access hole 55.

Once construction of the plate pack is complete, an access plate 54 is fitted over the access hole 55 so that a fluid-tight seal is formed.

In a preferred embodiment as shown in FIG. 12, the access plate 54 is further provided with a personnel access means 56 to allow a maintenance worker to enter the containing means without having to remove the access plate 54, as this could be difficult for one person without the aid of a lifting means. The personnel access means 56 is attached to the access plate 54 by hinge means and when closed forms a fluid-tight seal with said access plate 54.

What is claimed is:

1. A liquid treatment installation comprising:
   a containing vessel defining a substantially vertical flow channel of circular cross-section;
   a spiral separator comprising a conical helical plate which comprises a plurality of platelets, the conical helical plate defining a helical flow passage between axially facing surfaces of the plate, the spiral separator being disposed co-axially in the flow channel, the spiral separator being formed with a central axial channel, the diameter of the separator being substantially equal to that of the flow channel, the spiral separator being attached to an annular driving ring capable of rotating about the axis of the flow channel;
   an inlet means arranged to supply unseparated liquid to the containing vessel; and
   an outlet means arranged to withdraw treated liquid from the containing vessel, the inlet and outlet means being vertically spaced in relation to the containing vessel and the arrangement being such that between the inlet and the outlet means the liquid flows vertically through the helical flow passage of the spiral separator, wherein the dimensions of each platelet of the spiral separator are such that the platelets can pass through the central axial channel of the spiral separator.

2. A liquid treatment installation as claimed in claim 1 comprising a spiral separator which comprises a plurality of conical helical plates arranged in an intertwined multiple helix configuration to from a plate pack.

3. A liquid treatment installation as claimed in claim 1, where each platelet is shaped like a sector of an annulus, and each platelet has two concentrically curved edges wherein a shorter one of the two curved edges is concave and the longer curved edge is convex, and the curved edges are joined by respective leading and trailing edges extending radially with respect to the curved edges, each platelet also being curved about a radial axis, and wherein the platelet is separated from axially adjacent platelets by spacing means.

4. A liquid treatment installation as claimed in claim 3, wherein said spacing means is a flange section which has one or more radially inset portions and which is situated at the shorter curved edge of the platelet, and forms a cylindrically curved wall concentric with the concave curved edge.

5. A liquid treatment installation as claimed in claim 4, where said flange section is upstanding from the edge of the platelet.

6. A liquid treatment installation as claimed in claim 4, wherein said flange section depends from the edge of the platelet.

7. A liquid treatment installation as claimed in claim 4, wherein said flange section extends in both axial directions from the edge of the platelet.

8. A liquid treatment installation as claimed in claim 3, wherein the platelets are tapered across their cross-section in a direction from the leading edge of the platelet to the trailing edge of the platelet, or vice versa, so that the overlapping edges do not cause thickening at the joints.

9. A liquid treatment installation as claimed in claim 1, wherein said containing vessel is formed with an access hole with dimensions such that platelets may pass through it.

10. A liquid treatment installation as claimed in claim 9, wherein said access hole is formed at a lower portion of the containing vessel.

11. A liquid treatment installation as claimed in claim 1, wherein the flow channel is defined at least in part by at least one filler block within the containing vessel.

12. A platelet for use in a spiral separator plate pack of a liquid treatment installation, where said platelet is shaped like a sector of an annulus, and each platelet has two concentrically curved edges so that a shorter one of the two curved edges is concave and a longer curved edge is convex, and the curved edges are joined by respective leading and trailing edges extending radially with respect to the curved edges, each platelet also being curved about a radial axis, and wherein the dimensions of each platelet are such that the platelet can pass through a cylindrical passage having the same radius as that of the concave edge of the platelet.

13. A method of assembling a spiral separator in a containing vessel for use in a liquid treatment installation as claimed in claim 1, wherein a number of platelets are attached to a horizontal annular driving ring to form a first ring of platelets, and wherein platelets are passed through the central axial channel of the separator and attached to the underside of the platelets in the first ring to form a second and subsequent rings.

14. A method of assembling a spiral separator according to claim 13, wherein the annular driving ring is supported by a lifting means, and wherein the annular driving ring is lifted each time a ring of platelets is added.

15. A method of constructing a liquid treatment installation which includes the steps of;

providing a containing vessel having an open upper end;

providing an inlet and an outlet means in fluid communication with said containing vessel;

providing a bridge means at said open end of the containing vessel and supporting a horizontal annular driving ring on said bridge means;

providing the containing vessel with a launder;

attaching said launder to said outlet means for fluid communication between the launder and the outlet;

assembling a plate pack comprising a plurality of platelets within the containing vessel, the assembly step including the steps of;

suspending platelets from the annular driving ring to form a first ring of platelets;

passing platelets through a central axial channel formed by the first ring of platelets;

attaching platelets to the underside of the platelets in the first ring to form a plate pack comprising at least one conical helical plate.

16. A method of constructing a liquid treatment installation as claimed in claim 15, wherein said containing vessel is below ground level.

17. A method of constructing a liquid treatment installation as claimed in claim 15, wherein said containing vessel is a tank.

18. A method of constructing a liquid treatment installation which includes the steps of;

providing a containing vessel having an open upper end, a lower portion of said containing vessel being formed with an access hole, wherein the dimensions of said access hole are such that platelets may pass therethrough;

providing an inlet and an outlet means in fluid communication with said containing vessel;

providing a bridge means at said open end of the containing vessel and supporting an annular driving ring on said bridge means;

providing the containing vessel with a launder;

attaching said launder to said outlet means for fluid communication between the launder and the outlet;

assembling a plate pack comprising a plurality of platelets within the containing vessel which includes the steps of;

passing platelets through the access hole formed in the containing vessel;

suspending platelets from the annular driving ring to form a first ring of platelets;

attaching platelets to the underside of the platelets in the first ring to form a plate pack comprising at least one conical helical plate.

19. A method of constructing a liquid treatment installation as claimed in claim 18, wherein said access hole is formed in a lower portion of said containing vessel.

20. A method of constructing a liquid treatment installation as claimed in claim 18, wherein the annular driving ring is attached to a lifting means, and the annular driving ring is raised each time a ring of platelets is added to the bottom of the plate pack.

21. A method of constructing a liquid treatment installation as claimed in claim 18 wherein upon completion of said plate pack, said annular driving ring is suspended from said bridge means.

* * * * *